United States Patent
Ishibashi et al.

(10) Patent No.: US 9,043,059 B2
(45) Date of Patent: May 26, 2015

(54) BATTERY MODULE, ELECTRIC VEHICLE, AUTHENTICATION APPARATUS, AND DISCHARGING CONTROL METHOD FOR BATTERY MODULE

(75) Inventors: Yoshihito Ishibashi, Tokyo (JP);
Shigeru Tajima, Kanagawa (JP);
Daisuke Yamazaki, Kanagawa (JP);
Masahiro Suzuki, Kanagawa (JP)

(73) Assignee: SONY CORPORATION, Tokyo (JP)

(*) Notice: Subject to any disclaimer, the term of this patent is extended or adjusted under 35 U.S.C. 154(b) by 667 days.

(21) Appl. No.: 13/092,352

(22) Filed: Apr. 22, 2011

(65) Prior Publication Data
US 2011/0270480 A1    Nov. 3, 2011

(30) Foreign Application Priority Data

Apr. 30, 2010  (JP) ................. 2010-105217

(51) Int. Cl.
| | |
|---|---|
| *B60L 9/00* | (2006.01) |
| *G06F 1/02* | (2006.01) |
| *G06F 21/00* | (2013.01) |
| *B60R 25/00* | (2013.01) |
| *B60L 11/18* | (2006.01) |
| *H02J 7/00* | (2006.01) |

(52) U.S. Cl.
CPC ......... *B60L 11/1824* (2013.01); *B60L 11/1801* (2013.01); *B60L 11/1838* (2013.01); *B60L 11/1846* (2013.01); *B60L 2200/12* (2013.01); *B60L 2270/34* (2013.01); *H02J 2007/0001* (2013.01); *Y02T 10/7005* (2013.01); *Y02T 10/7088* (2013.01); *Y02T 10/7258* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
USPC ................... 701/22; 455/556.1, 574; 705/31;
726/17; 708/250; 320/106–119,
320/134–136; 713/182; 340/426.11
See application file for complete search history.

(56) References Cited

U.S. PATENT DOCUMENTS

| | | | | |
|---|---|---|---|---|
| 6,769,060 | B1* | 7/2004 | Dent et al. | ..... 713/168 |
| 7,667,429 | B2* | 2/2010 | Little | ..... 320/106 |
| 2004/0204182 | A1* | 10/2004 | Angelo et al. | ..... 455/574 |
| 2005/0010782 | A1* | 1/2005 | Ohkubo | ..... 713/182 |
| 2005/0035738 | A1* | 2/2005 | Patino et al. | ..... 320/106 |
| 2005/0108309 | A1* | 5/2005 | Tsuboka et al. | ..... 708/250 |

(Continued)

FOREIGN PATENT DOCUMENTS

| | | |
|---|---|---|
| JP | 2008-042985 | 2/2008 |
| WO | WO 2004074042 A2 * | 9/2004 |

*Primary Examiner* — James Trammell
*Assistant Examiner* — Majdi Alsomiri
(74) *Attorney, Agent, or Firm* — Hazuki International, LLC

(57) ABSTRACT

There is provided a battery module including: a power storage unit storing power; a first authentication unit carrying out first authentication via a first authentication route; a second authentication unit carrying out second authentication via a second authentication route; and a discharging control unit controlling discharging from the power storage unit to an external appliance, wherein the first authentication unit is operable, when the first authentication has succeeded, to share key information to be used in the second authentication with an authentication party for the second authentication, the second authentication unit carries out the second authentication using the key information shared with the authentication party, and the discharging control unit is operable, when the second authentication has succeeded, to permit discharging from the power storage unit.

15 Claims, 10 Drawing Sheets

(56) References Cited

U.S. PATENT DOCUMENTS

| | | | |
|---|---|---|---|
| 2008/0218322 A1* | 9/2008 | Shii | 340/426.11 |
| 2010/0024029 A1* | 1/2010 | Sasaki et al. | 726/17 |
| 2010/0308771 A1* | 12/2010 | Densham | 320/134 |
| 2011/0089900 A1* | 4/2011 | Hogari | 320/118 |
| 2011/0144844 A1* | 6/2011 | Ishibashi | 701/22 |
| 2011/0184585 A1* | 7/2011 | Matsuda et al. | 700/297 |

* cited by examiner

BATTERY MODULE, ELECTRIC VEHICLE, AUTHENTICATION APPARATUS, AND DISCHARGING CONTROL METHOD FOR BATTERY MODULE

CROSS REFERENCES TO RELATED APPLICATIONS

The present application claims priority to Japanese Priority Patent Application JP 2010-105217 filed in the Japan Patent Office on Apr. 30, 2010, the entire content of which is hereby incorporated by reference.

BACKGROUND

The present application relates to a battery module, an electric vehicle, an authentication apparatus, and a discharging control method for a battery module.

Increasing concern over environmental problems in recent years has led to much attention being focused on electric vehicles, starting with electric cars. As a power source, electric cars are equipped with a large-capacity battery constructed of lithium ion cells or the like. Note that the capacity of a battery provided in an electric car is around 20 kWh. When lithium ion cells are used, the cost per kWh is presently over 100,000 yen, which means that the battery provided in an electric vehicle has a high manufacturing cost. Accordingly, there is a high risk of the battery provided in an electric vehicle being stolen. For this reason, there is demand for anti-theft measures for a battery. As one example, Japanese Laid-Open Patent Publication No. 2008-42985 discloses a method for preventing theft of a battery using a comparatively simple method.

SUMMARY

When the method disclosed in the publication mentioned above is adopted, a degree of protection against the theft of a battery provided in an electric vehicle can be achieved. However, the disclosed method does not go as far as considering a case where the battery of an electric car is transferred to another electric car or a home battery server. Since the battery of an electric car is used in a comparatively severe environment, the usage conditions are set comparatively strictly compared to a battery used in a home battery server (i.e., a home battery system) or the like. This means that in many cases, a battery that can no longer be used in an electric car can still achieve sufficient performance for use in another electric vehicle (for example, an electric bicycle or an electric motorcycle), a home battery server, or the like.

Since technology for transferring the battery of an electric vehicle to other purposes is extremely important from the viewpoint of making effective use of a costly battery, there is demand for a technology capable of enabling a battery to be transferred to another purpose while preventing theft of the battery. Note that although an example where the battery of an electric car is transferred to use in another electric vehicle, a home battery server, or the like, is described here, it would also be conceivably possible to transfer a battery used in a home battery server to a domestic appliance. Here, it should be obvious that it is also important to maintain security against theft of the battery in such other electric vehicle, domestic appliance, home battery server, or the like. Accordingly, there is demand for a technology that enables a battery to be transferred to another purpose while maintaining security against theft of the battery.

The present application was conceived in view of the problem described above and it is an aim of the present application to provide a novel and improved battery module, electric vehicle, authentication apparatus, and discharging control method for a battery module that enable a battery module to be transferred to another appliance while maintaining security against theft of the battery module.

According to an embodiment of the present disclosure, there is provided a battery module which includes a power storage unit storing power; a first authentication unit carrying out first authentication via a first authentication route; a second authentication unit carrying out second authentication via a second authentication route; and a discharging control unit controlling discharging from the power storage unit to an external appliance. The first authentication unit is operable, when the first authentication has succeeded, to share key information to be used in the second authentication with an authentication party for the second authentication, the second authentication unit carries out the second authentication using the key information shared with the authentication party, and the discharging control unit is operable, when the second authentication has succeeded, to permit discharging from the power storage unit.

Furthermore, the first authentication unit may carry out the first authentication with an authentication apparatus owned by a user via the first authentication route, and the second authentication unit may carry out the second authentication with the authentication apparatus via the second authentication route.

Furthermore, the first authentication unit may carry out the first authentication with a first authentication apparatus via the first authentication route, and the second authentication unit may carry out the second authentication with a second authentication apparatus that differs to the first authentication apparatus via the second authentication route.

Furthermore, the first authentication unit may carry out the first authentication using a first communication path where direct communication with the authentication apparatus is possible, and the second authentication unit may carry out the second authentication using a second communication route that differs to the first communication path.

Furthermore, the battery module may be installed in an electric vehicle including: a driving unit driving the electric vehicle using power supplied from the power storage unit; and a control unit controlling supplying of power to the driving unit.

Furthermore, the second authentication unit may carry out the second authentication using the second communication path that passes the control unit of the electric vehicle.

According to an embodiment of the present disclosure, there is provided an electric vehicle which includes a connection terminal for connecting to a battery module that includes a power storage unit storing power, a first authentication unit carrying out first authentication via a first authentication route, a second authentication unit carrying out second authentication via a second authentication route, and a discharging control unit controlling discharging from the power storage unit to an external appliance, wherein the first authentication unit is operable, when the first authentication has succeeded, to share key information to be used in the second authentication with an authentication party for the second authentication, the second authentication unit carries out the second authentication using the key information shared with the authentication party, and the discharging control unit is operable, when the second authentication has succeeded, to permit discharging from the power storage unit; a driving unit driving the electric vehicle using power supplied from the power storage unit; and a control unit controlling supplying of power to the driving unit.

According to an embodiment of the present disclosure, there is provided an authentication apparatus carrying out authentication for a battery module that includes a power storage unit storing power, a first authentication unit carrying out first authentication via a first authentication route, a second authentication unit carrying out second authentication via a second authentication route, and a discharging control unit controlling discharging from the power storage unit to an external appliance, wherein the first authentication unit is operable, when the first authentication has succeeded, to share key information to be used in the second authentication with an authentication party for the second authentication, the second authentication unit carries out the second authentication using the key information shared with the authentication party, and the discharging control unit is operable, when the second authentication has succeeded, to permit discharging from the power storage unit, the authentication apparatus which includes a first authentication unit carrying out the first authentication via a first authentication route; and a second authentication unit carrying out the second authentication via a second authentication route.

According to an embodiment of the present disclosure, there is provided a discharging control method for a battery module that includes a power storage unit storing power and a discharging control unit controlling discharging of the power storage unit to an external appliance, the discharging control method including steps of the battery module: carrying out first authentication via a first authentication route; sharing key information to be used in second authentication with an authentication party for the second authentication when the first authentication has succeeded; carrying out the second authentication via a second authentication route using the key information shared with the authentication party; and permitting discharging from the power storage unit by the discharging control unit when the second authentication has succeeded.

Additional features and advantages are described herein, and will be apparent from the following Detailed Description and the figures.

DETAILED DESCRIPTION

Figure 1:
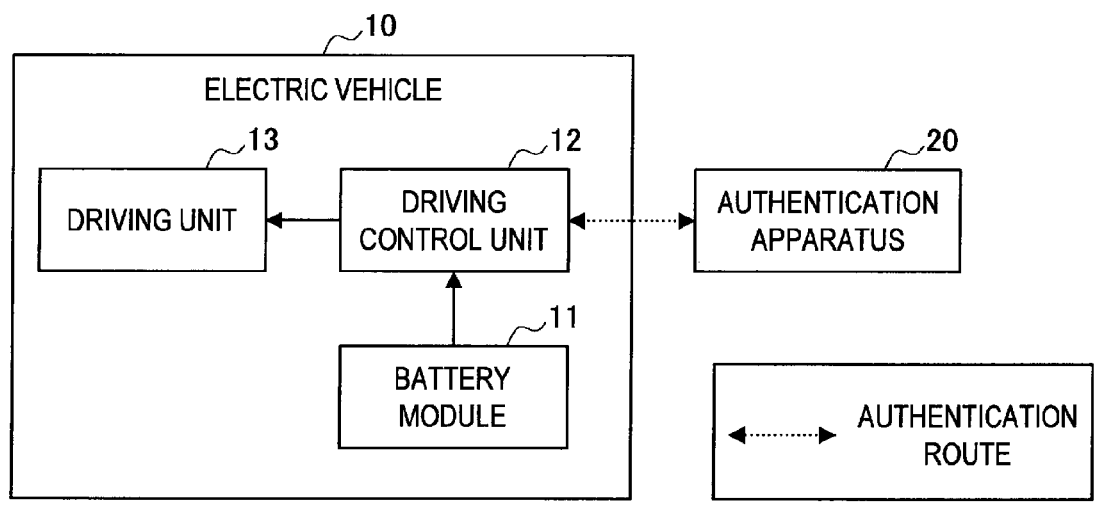
FIG. 1 is a diagram useful in schematically showing the configuration of an electric vehicle.

Embodiments of the present application will be described below in detail with reference to the drawings.

Hereinafter, preferred embodiments of the present application will be described in detail with reference to the appended drawings. Note that, in this specification and the appended drawings, structural elements that have substantially the same function and structure are denoted with the same reference numerals, and repeated explanation of these structural elements is omitted.

Flow of the Description

The flow of the description of the embodiments of the present application given below will first be stated in brief. A typical authentication method carried out by a user when driving an electric vehicle 10 will be described with reference to FIG. 1. Next, the aim of the present embodiment will be described having identified problems with such typical authentication method with reference to FIGS. 2 and 3. After that, the configuration of an electric vehicle 10 according to the present embodiment will be described with reference to FIG. 4. An authentication method for a battery module 11 according to the present embodiment and a method of transferring the battery module 11 will then be described with reference to FIG. 5.

Next, the flow of processing carried out when the electric vehicle 10 according to the present embodiment is driven will be described with reference to FIG. 6. After that, the flow of processing executed when the battery module 11 is moved from the electric vehicle 10 according to the present embodiment to a home battery server 30 will be described with reference to FIG. 7. A modification to the electric vehicle 10 and the battery module 11 according to the present embodiment will then be described with reference to FIG. 8. After that, the configurations of the electric vehicle 10 and authentication apparatuses 20, 21, and 22 according to the present embodiment and such modification will be described in detail with reference to FIGS. 9 and 10. Finally, the technological concept of the same embodiment will be reviewed, and the operational effect obtained from such technological concept will be described in brief.

Description Headings

1. Introduction
1-1. Typical Authentication for Driving Electric Vehicle 10
1-2. Theft of Battery Module 11
1-3. Transfer of Battery Module 11
2. Embodiment
2-1. Authentication of Battery Module 11
2-2. Authentication Operation for Driving Vehicle
2-3. Processing and Operations for Battery Transfer
2-4. Modification (Configuration with Separate Authentication Parties)
2-5. Detailed Configuration of Electric Vehicle 10
2-5-1. Electric Vehicle 10
2-5-2. Authentication Apparatus 20
2-5-3. Communication Devices/Methods
2-5-4. Modification
3. Conclusion 1. Introduction First, a typical authentication method carried out when driving an electric vehicle 10, which is an electric car or the like, will be described. Theft of the battery module 11, which may happen when only a typical authentication method is used, and problems when transferring the battery module 11 to another purpose will also be described.

1-1. Typical Authentication for Driving Electric Vehicle 10

First, a typical authentication method relating to driving the electric vehicle 10 will be described with reference to FIG. 1. FIG. 1 is a diagram useful in explaining typical authentication relating to driving the electric vehicle 10. As shown in FIG. 1, the electric vehicle 10 mainly includes a battery module 11, a driving control unit 12, and a driving unit 13. In the electric vehicle 10, the driving unit 13 is driven by supplying power stored in the battery module 11. As one example, the driving unit 13 is constructed from a motor or the like for providing a driving force. Note that driving control of the driving unit 13 is carried out by the driving control unit 12.

Normally, when the user drives the electric vehicle 10, authentication is carried out to confirm whether such user is permitted to drive the electric vehicle 10. Such authentication is carried out by the authentication apparatus 20 that is outside the electric vehicle 10. That is, the authentication apparatus 20 functions as a key for permitting power on and operation or the like of the electric vehicle 10. As one example, it is possible to use an immobilizer or the like of the electric vehicle 10 as the authentication apparatus 20. However, it should be obvious that the authentication apparatus 20 may have an arbitrary form.

When authentication between the electric vehicle 10 and the authentication apparatus 20 has succeeded, the electric vehicle 10 permits the driving control unit 12 to supply power from the battery module 11 to the driving unit 13. That is, since driving the electric vehicle 10 is permitted when authentication between the electric vehicle 10 and the authentication apparatus 20 has succeeded, the authentication apparatus 20 functions as a key for controlling power on and operation of the electric vehicle 10. Note that the authentication mentioned above may be carried out with the driving control unit 12, for example.

1-2. Theft of Battery Module 11

Figure 2:
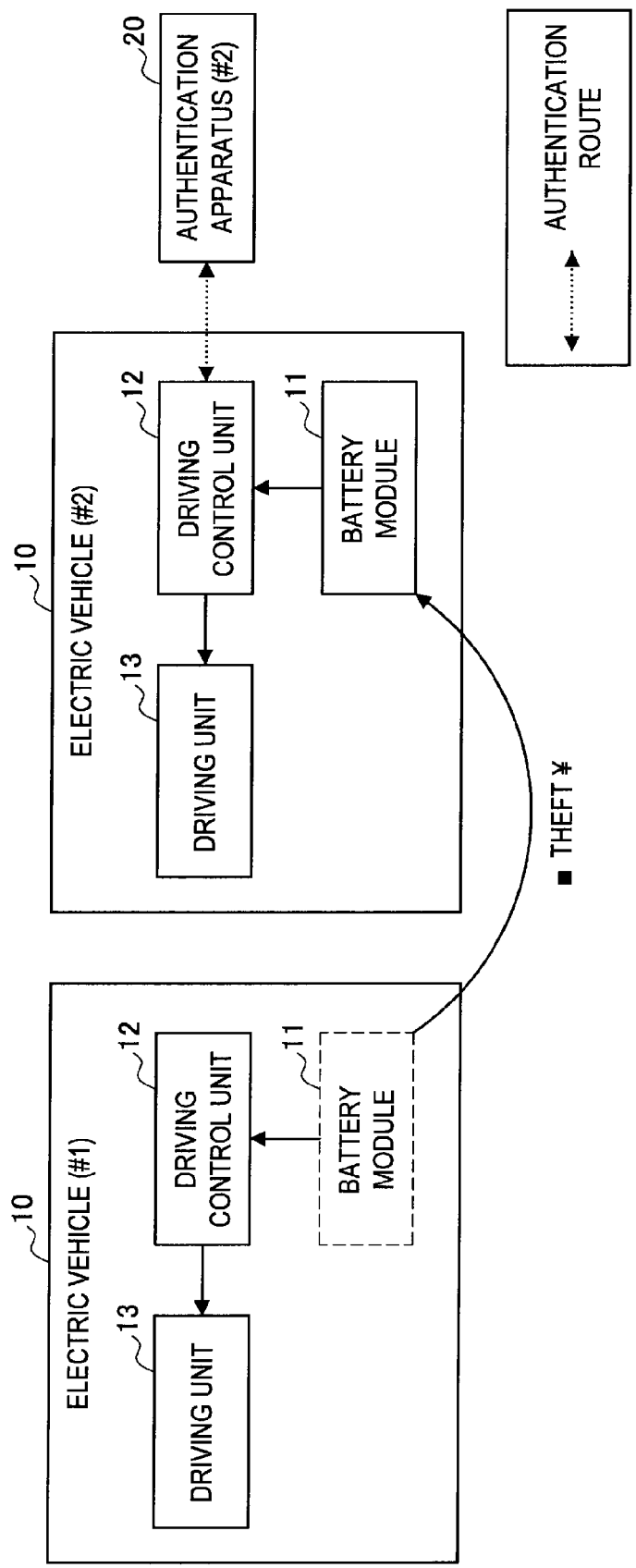
FIG. 2 is a diagram useful in explaining the problems with an electric vehicle.

As described above, by confirming whether driving of the electric vehicle 10 is permitted via authentication that uses the authentication apparatus 20, it is possible to prevent improper use of the electric vehicle 10. However, the authentication described above is not authentication relating to permission to use the battery module 11. This means that as shown in FIG. 2, it is possible to remove the battery module 11 from the electric vehicle 10 (#1) and use the battery module 11 in another electric vehicle 10 (#10). That is, even if the battery module 11 is a stolen battery, the thief will still be able to use his/her own authentication apparatus 20 (#2) to carry out authentication with his/her own electric vehicle 10 (#2) and drive such electric vehicle 10 (#2).

To prevent theft of the battery module 11, as one example it is necessary to associate electric vehicles 10 and battery modules 11 on a one-to-one basis and limit the supplying of power to the electric vehicle 10 associated with each battery module 11. To associate electric vehicles 10 and battery modules 11 on a one-to-one basis, as one example it would be possible to provide an arrangement for carrying out authentication between an electric vehicle 10 and a battery module 11 and to permit the supplying of power by the battery module 11 only when such authentication has succeeded.

By providing such framework, even if a thief connects a battery module 11 that has been stolen to his/her own electric vehicle 10 (#2), authentication between the electric vehicle 10 (#2) and such battery module 11 will not succeed and supplying of power by the battery module 11 will not be permitted. As a result, theft of the battery module 11 can be deterred.

1-3. Transfer of Battery Module 11

However, if electric vehicles 10 and battery modules 11 are associated on a one-to-one basis, it will become difficult to transfer the battery module 11 to another appliance, such as another electric vehicle 10 or a home battery server 30 (a home battery system). Here, transferring the battery module 11 from the electric vehicle 10 to the home battery server 30 will be described with reference to FIG. 3.

In recent years, the use of power generating equipment (hereinafter referred to as "green power generation equipment") that uses renewable energy, resources with a low environmental impact, or the like has spread even to typical households. Photovoltaic generation equipment can be given as a representative example of power generating equipment that uses renewable energy. Natural gas-driven power generation equipment and fuel cells can be given as representative examples of power generating equipment that uses resources with a low environmental impact.

The time zone when power is generated using such green power generating equipment does not always match a time zone when power is consumed by a household. For example, although power is generated using photovoltaic generation equipment during the day when the sun is out, it is difficult for a typical household to consume all of the generated power during the day. In many cases, the power that has been generated using green power generating equipment ends up being sold to a power company.

From now on, it is believed that systems (hereinafter "home battery systems") that store the power generated using such green power generating equipment in a battery (hereinafter "home battery") and use the power stored in the home battery as necessary will become increasingly widespread. However, compact, large-capacity batteries are costly. For this reason, there is attention on transferring (i.e., making use of) the battery modules 11 of electric vehicles 10 that have become old.

The output voltage of the battery module 11 of the electric vehicle 10 is frequently controlled in accordance with driving control (i.e., starting off/stopping/acceleration/deceleration) of the electric vehicle 10. That is, the battery module 11 of the electric vehicle 10 is used under severe conditions. This means that from the viewpoints of safety, driving performance, product life, and the like, the performance standards of a battery module 11 that can be used are set extremely strictly so as to stably achieve a specified performance.

Meanwhile, in the case of a home battery, it is hard to imagine a severe usage situation where the output voltage changes frequently in short periods or the outputting of power in excess of a specified value is continuously maintained for a long time. That is, so long as there are no problems such as a large fall in voltage, charging or discharging abnormalities, leakage of battery fluid, and fire, a battery that does not satisfy the standard for the battery module 11 of an electric vehicle 10 can still be sufficiently used as a home battery.

An old battery module 11 is not limited to being transferred to use as a home battery and it would also be conceivably possible to transfer a battery module 11 from a large electric vehicle 10 (such as an electric car) to a small electric vehicle 10 (such as an electric motorcycle). There is a great need for such transferring of battery modules 11. However, if electric vehicles 10 and battery modules 11 are associated on a one-to-one basis, it becomes difficult to transfer a battery module 11 to a home battery server 30 or the like.

Figure 3:
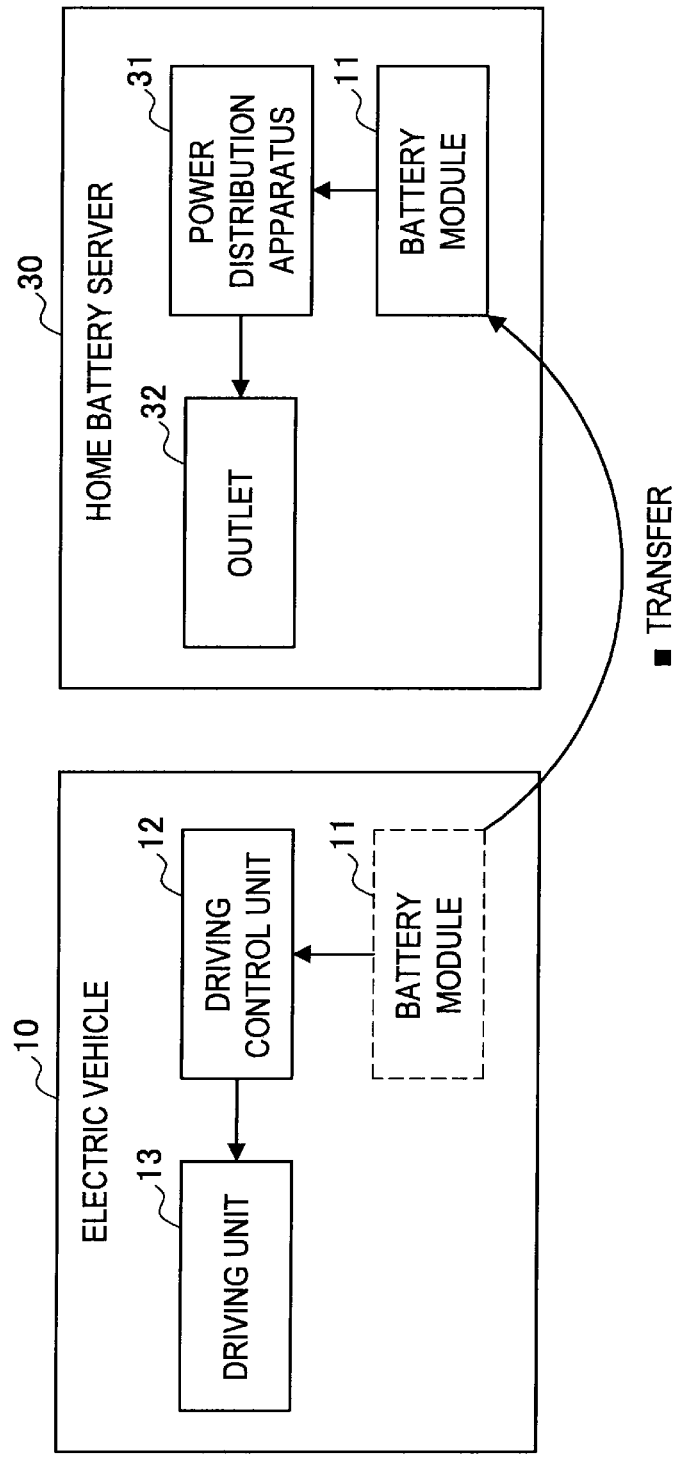
FIG. 3 is a diagram useful in explaining the problems with an electric vehicle.

For example, as shown in FIG. 3, in the home battery server 30, the battery module 11 is connected to a power distribution apparatus 31. However, the battery module 11 is associated on a one-to-one basis with the electric vehicle 10. This means the power distribution apparatus 31 that has not been associated as a recipient of power is unable to receive power supplied from the battery module 11. For this reason, an arrangement that is capable of changing the appliance associated with a battery module 11 as a recipient of power while maintaining security against theft is required.

2. Embodiment

As described earlier, there is demand for an arrangement that is capable of enabling reuse of the battery module 11 of the electric vehicle 10 while avoiding the risk of theft. The embodiment described below provides this kind of arrangement.

Overview

The arrangement according to the present embodiment includes a framework that directly authenticates the battery module 11 from outside (hereinafter referred to as "first authentication"), and when such authentication has succeeded, is capable of carrying out authentication for power on and operation of the electric vehicle 10 (hereinafter referred to as "second authentication"). For example, when the first authentication has succeeded, key information to be used in the second authentication is provided from the battery module 11 to the authentication apparatus 20. Note that the party that carries out first authentication with the battery module 11 may be the authentication apparatus 20 equipped with a function for the first authentication or may be an external management function (for example, a service center or a maintenance center).

This arrangement is not provided in a typical battery module 11 or authentication apparatus 20. For this reason, with a typical arrangement, a thief is capable of moving such battery module 11 and using it in another electric vehicle 10. However, with the arrangement that uses the first and second authentication mentioned above, even when a thief has moved the battery module 11 from an electric vehicle 10 to another electric vehicle 10, if the first authentication of the battery module 11 cannot be carried out successfully, the second authentication will not be implemented and it will not be possible to drive the other electric vehicle 10. As a result, theft of the battery module 11 is prevented.

Meanwhile, in the other electric vehicle 10 to which the battery module 11 has been transferred, if the first authentication is carried out properly for the battery module 11 from outside and key information used in the second authentication is provided to the authentication apparatus 20 corresponding to the other electric vehicle 10, it will become possible to use the other electric vehicle 10. That is, if the arrangement according to the present embodiment is adopted, it is possible to enable transfer of the battery module 11 while preventing theft. Note that when the battery module 11 is removed, the key information stored by the authentication apparatus 20 corresponding to the electric vehicle 10 from which the battery module 11 has been removed is deleted.

This completes the overview of the arrangement according to the present embodiment.

2-1. Authentication of Battery Module 11

Next, the configurations of the electric vehicle 10 and authentication apparatus 20 and the authentication method according to the present embodiment will be described with reference to FIGS. 4 and 5. In particular, the present embodiment relates to the authentication method for the battery module 11. For this reason, the authentication method will be described in detail and the flow of the authentication when the battery module 11 has been moved (transferred) will be described in detail.

Figure 4:
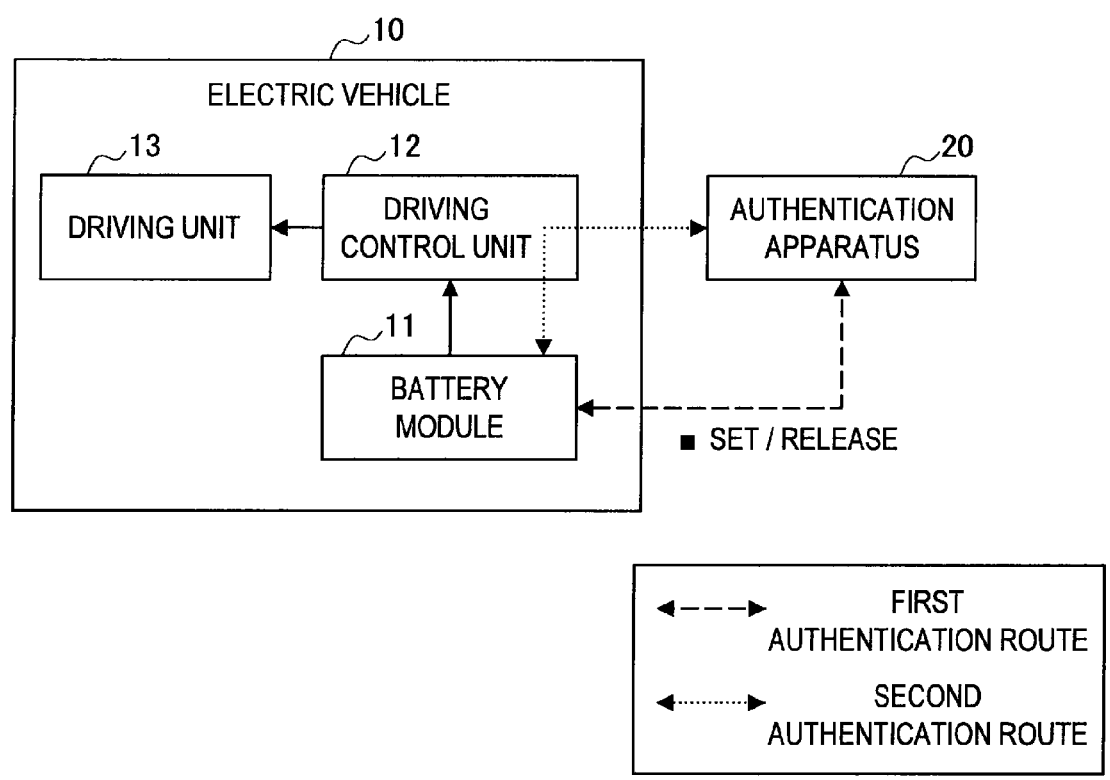
FIG. 4 is a diagram useful in explaining the overall configuration of an electric vehicle according to an embodiment.

As shown in FIG. 4, the electric vehicle 10 mainly includes the battery module 11, the driving control unit 12, and the driving unit 13. This electric vehicle 10 differs to the electric vehicle 10 shown in FIG. 1 in the functions of the battery module 11 and the authentication apparatus 20 relating to the first and the second authentication mentioned above. Note that in the example in FIG. 4, the authentication apparatus 20 is configured so as to carry out the first and second authentication mentioned above.

The authentication according to the present embodiment is carried out between the battery module 11 and the authentication apparatus 20. Here, two authentication routes (hereinafter referred to as the "first authentication route" and the "second authentication route") are present between the battery module 11 and the authentication apparatus 20. The difference between the authentication routes is not limited to a difference in the physical communication path that is used and may refer to a difference in authentication method (or key) and/or the devices that carry out authentication. Note that although an example where a communication path for direct communication with the battery module 11 is used as the first authentication route and a communication path via the driving control unit 12 is used as the second authentication route is shown in FIG. 4, the present application is not limited to this.

The first authentication route is an authentication route for carrying out the first authentication mentioned above. That is, the first authentication is carried out between the battery module 11 and the authentication apparatus 20 via the first authentication route and when the first authentication succeeds, key information to be used in the second authentication is provided from the battery module 11 to the authentication apparatus 20. Hereinafter, a state where the key information to be used in the second authentication has been provided to the authentication apparatus 20 (i.e., a state where the key has been shared) is referred to using the expression "binding".

As described above, if the first authentication succeeds via the first authentication route, a bind is set. Also, when the battery module 11 is removed from the electric vehicle 10, the first authentication is carried out via the first authentication route and if the first authentication succeeds, the bind is removed. Note that the expression "the bind is removed" here refers to the key information shared between the battery module 11 and the authentication apparatus 20 being deleted. In this way, the first communication route is used to set and remove a bind.

Meanwhile, the second authentication route is an authentication route for carrying out the second authentication mentioned above. That is, the second authentication is carried out between the battery module 11 and the authentication apparatus 20 via the second authentication route and if the second authentication has succeeded, the supplying of power from the battery module 11 is permitted. Note that the key information shared between the battery module 11 and the authentication apparatus 20 when the first authentication succeeded is used in the second authentication. Note that it is possible to use various authentication methods, such as mutual authentication that uses a random number, public key encryption, or the like as the specific authentication methods of the first and second authentication described above.

As described above, it is not possible to use the battery module 11 according to the present embodiment when the first authentication has succeeded and the second authentication has not succeeded. However, in many cases, the first authentication is carried out when the battery module 11 is transferred to the electric vehicle 10. This means that when a user uses the electric vehicle 10, such user only needs to carry out the second authentication using the authentication apparatus 20. If the second authentication succeeds, the user becomes able to use the electric vehicle 10. Meanwhile, if the battery module 11 is transferred, an operation shown in FIG. 5 becomes necessary.

Figure 5:
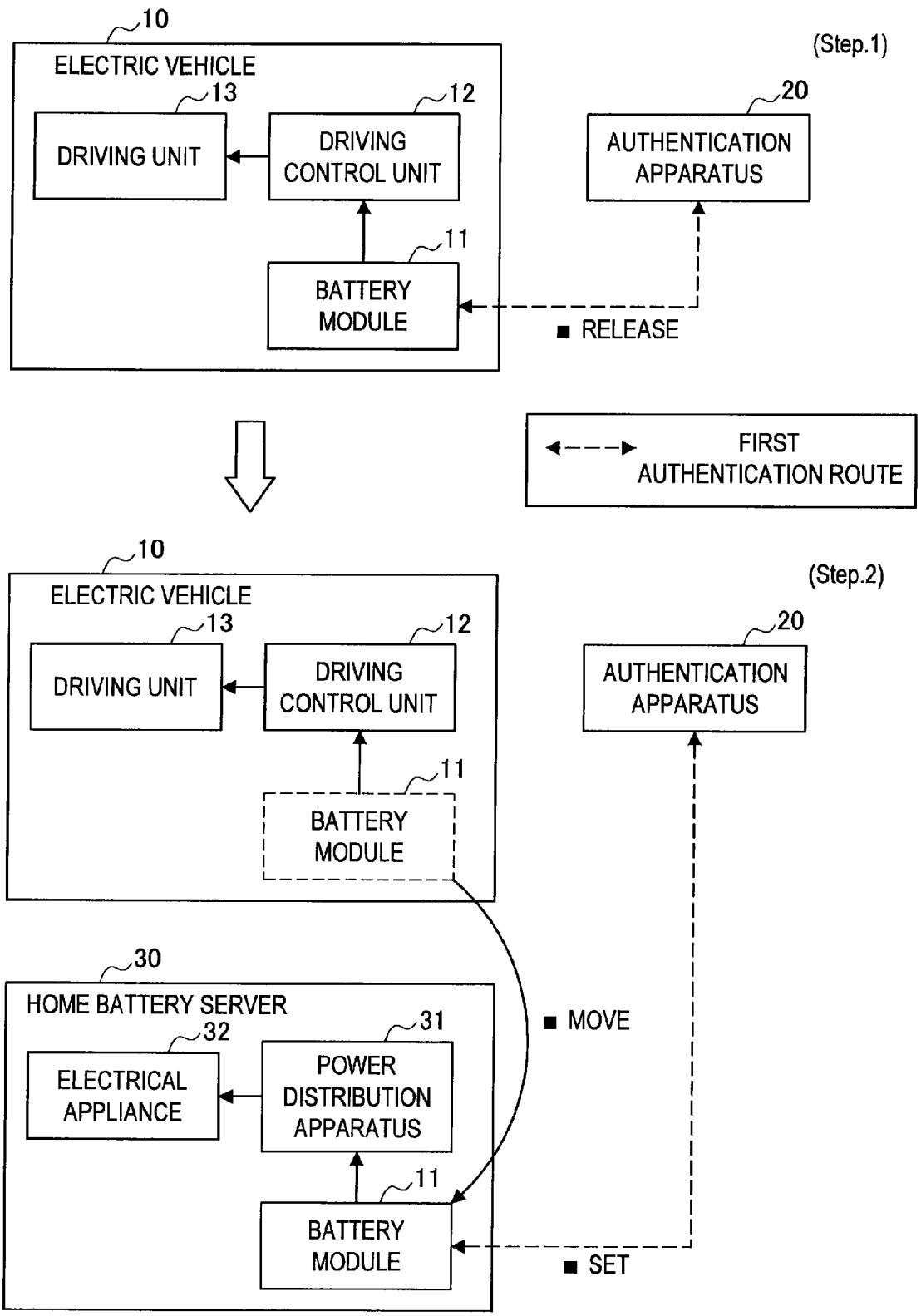
FIG. 5 is a diagram useful in explaining the content of processing carried out when a battery module according to the same embodiment is moved.

FIG. 5 shows an example where the battery module 11 of the electric vehicle 10 is transferred to the home battery server 30. As shown in FIG. 5, the user first uses the authentication apparatus 20 to remove the bind between the battery module 11 and the electric vehicle 10 (Step. 1). When doing so, first authentication via the first authentication route is carried out between the battery module 11 and the authentication apparatus 20 and the bind is removed if the first authentication succeeds. Although it should be obvious, the battery module 11 is limited to being bound to one appliance. That is, the authentication method according to the present embodiment is an arrangement where it is not possible to set a bind for another transferred-to appliance unless an existing bind has been removed.

After the bind has been removed, the user physically moves the battery module 11 from the electric vehicle 10 to the home battery server 30. After this, the user uses the authentication apparatus 20 to set a bind between the battery module 11 and the home battery server 30 (Step. 2). At this time, first authentication via the first authentication route is carried out between the battery module 11 and the authentication apparatus 20 and a bind is set if the first authentication succeeds.

When a bind is set, since key information to be used by the second authentication is shared between the battery module 11 and the authentication apparatus 20, it becomes possible to carry out the second authentication. After the bind has been set, if the user carries out the second authentication using the authentication apparatus 20, it becomes possible for the user to use the battery module 11 that has been moved to the home battery server 30 in the home battery server 30. Note that although an example where the battery module 11 is moved from the electric vehicle 10 to the home battery server 30 is described here, the same applies when the battery module 11 is moved to a different appliance.

This completes the description of authentication of the battery module 11 according to the present embodiment.

2-2. Authentication Operation for Driving

Next, the flow of processing carried out by the battery module 11 according to the present embodiment when driving the electric vehicle 10 will be described with reference to FIG. 6. FIG. 6 is a diagram useful in explaining the flow of processing carried out by the battery module 11 according to the present embodiment when the electric vehicle 10 is driven.

Figure 6:
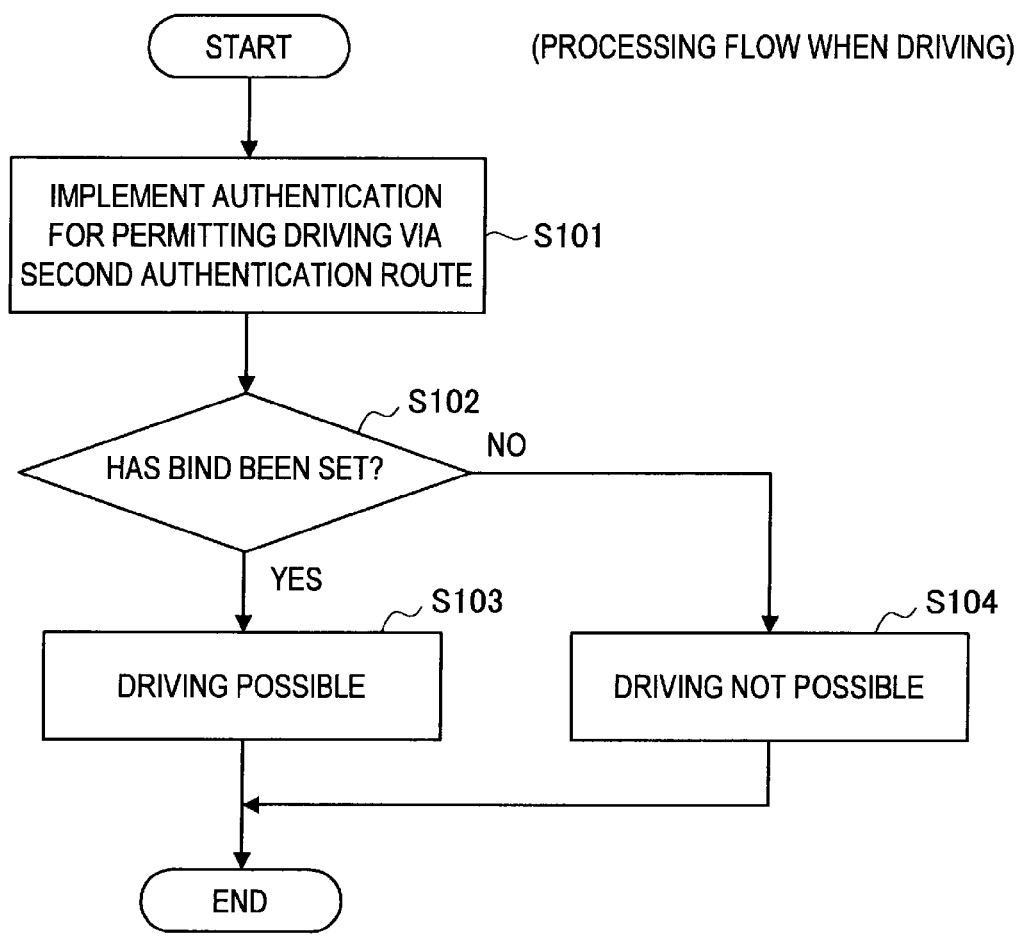
FIG. 6 is a diagram useful in explaining the flow of processing carried out when the electric vehicle according to the same embodiment is driven.

As shown in FIG. 6, first, the battery module 11 starts the authentication (the "second authentication") that permits driving (i.e., use of the battery module 11) with the authentication apparatus 20 via the second authentication route (S101). When doing so, the battery module 11 determines whether a bind has been set (S102). As one example, the battery module 11 confirms whether key information has been shared with the authentication apparatus 20. When a bind has been set, the processing by the battery module 11 proceeds to step S103. Meanwhile, when a bind has not been set, the processing by the battery module 11 proceeds to step S104.

When the processing has proceeded to step S103, the battery module 11 permits supplying of power to the driving unit 13. When supplying of power to the driving unit 13 is permitted, the driving control unit 12 supplies power to the driving unit 13 and controls the driving of the electric vehicle 10. By doing so, it becomes possible to drive the electric vehicle 10 and the series of processing ends.

Meanwhile, when the processing has proceeded to step S104, since the battery module 11 is not able to implement the second authentication, the supplying of power to the driving unit 13 is not permitted and the series of processing ends. In this way, discharging of the battery module 11 is permitted when both a bind has been set and the second authentication has succeeded. With this configuration, if the battery module 11 is stolen and connected to another transferred-to appliance, it will not be possible to use the battery module 11 at the transferred-to appliance.

2-3. Processing and Operations for Battery Transfer

Figure 7:
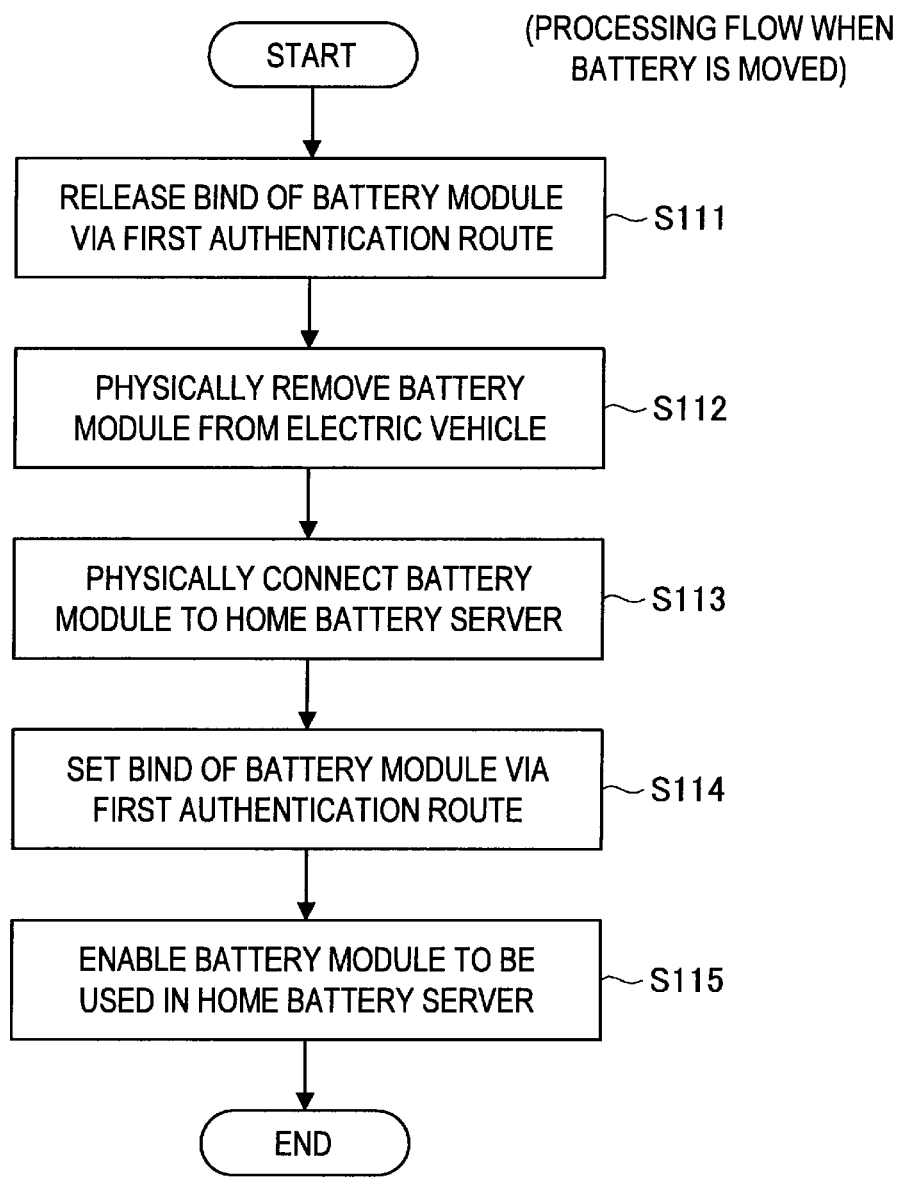
FIG. 7 is a diagram useful in explaining the flow of processing carried out when the battery module according to the same embodiment is moved.

Next, the flow of the processing and operations carried out when the battery module 11 is moved from the electric vehicle 10 to the home battery server 30 will be described with reference to FIG. 7. FIG. 7 is a diagram useful in explaining the flow of processing and operations carried out when the battery module 11 is moved from the electric vehicle 10 to the home battery server 30.

As shown in FIG. 7, first, the first authentication is carried out between the battery module 11 and the authentication apparatus 20 via the first authentication route. If the first authentication succeeds, the bind is then removed (S111). Next, the battery module 11 is physically removed from the electric vehicle 10 (S112). After this, the battery module 11 that has been removed from the electric vehicle 10 is physically and electrically connected to the home battery server 30 (S113).

Next, the first authentication is carried out between the battery module 11 and the authentication apparatus 20 via the first authentication route. If the first authentication succeeds, a bind is then set (S114). After this, the second authentication is carried out between the battery module 11 and the authentication apparatus 20 via the second authentication route. If the second authentication succeeds, it becomes possible to use the battery module 11 in the home battery server 30 (S115).

In this way, by providing an arrangement for sharing the key based on the first authentication that removes or sets a bind and an arrangement for second authentication that uses the shared key, it is possible to enable the battery module 11 to be transferred while maintaining security against theft of the battery module 11.

2-4. Modification (Configuration with Separate Authentication Parties)

Figure 8:
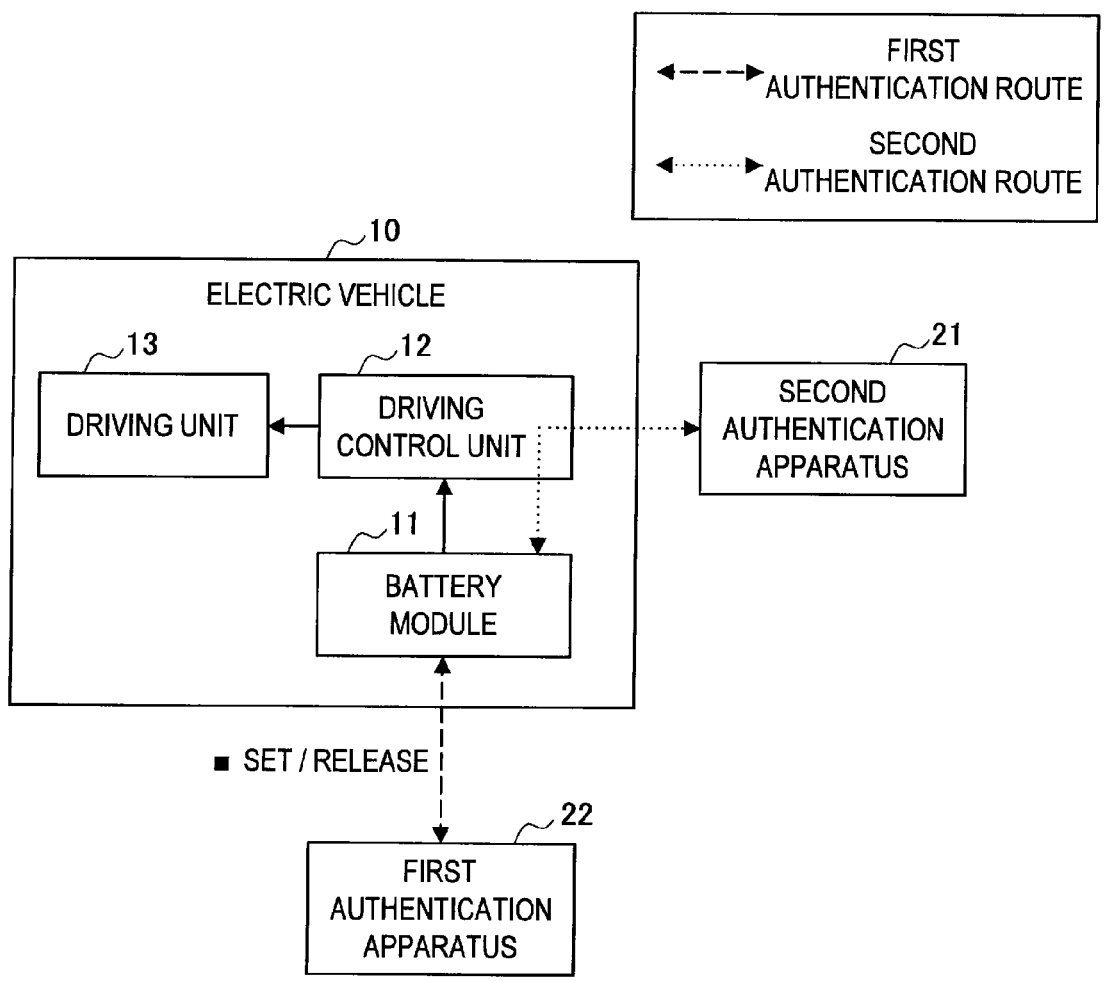
FIG. 8 is a diagram useful in explaining a modification to the electric vehicle and the battery module according to the same embodiment.

Next, a modification to the battery module 11 according to the present embodiment will be described with reference to FIG. 8. FIG. 8 is a diagram useful in explaining a configuration of the battery module 11 and an authentication method according to a modification to the embodiment described above. Note that component elements that are effectively the same as the component elements shown in FIG. 4 have been assigned the same reference numerals and detailed description thereof is omitted.

The battery module 11 described thus far carries out the first authentication and the second authentication with one authentication apparatus 20. However, as shown in FIG. 8, the battery module 11 may be configured so as to carry out the first authentication and the second authentication with two different authentication apparatuses (a first authentication apparatus 22 and a second authentication apparatus 21). In the example in FIG. 8, the first authentication apparatus 22 carries out the first authentication via the first authentication route and the second authentication apparatus 21 carries out the second authentication via the second authentication route. As described earlier, the first authentication is mainly carried out when the battery module 11 is moved and is not carried out frequently. Meanwhile, the second authentication is carried out when changing or starting to use the appliance to which the battery module 11 has been transferred (in the example in FIG. 8, the electric vehicle 10).

In this way, there is a large difference in implementation frequency between the first authentication and the second authentication. From the viewpoint of convenience, a second authentication function should be provided in an immobilizer or the like carried by the user. Accordingly, the second authentication apparatus 21 should preferably be a device, such as an immobilizer, that is carried by the user. Meanwhile, a first authentication function does not need to be provided in a device carried by the user.

The first authentication apparatus 22 also does not need to be a device that is managed by the user. As one example, the first authentication apparatus 22 may be a device that is managed by an external authentication body or a service center. In this modification, by splitting the first authentication and the second authentication between authentication apparatuses, it is possible to separate the user of the battery module 11 (for example, the user of the electric vehicle 10) and the manager of the bind.

This completes the description of a modification to the present embodiment. As described above, by providing an arrangement that carries out two types of authentication (first authentication and second authentication) in the battery module 11, an arrangement that enables the battery module 11 to be transferred to other uses while maintaining security against theft is realized.

2-5. Detailed Configuration of Electric Vehicle 10

To describe the authentication method according to the present embodiment in an easy-to-understand manner, the configurations of the electric vehicle 10 and the authentication apparatus 20 have been described thus far in a simplified form. For this reason, the configurations of the electric vehicle 10 and the authentication apparatus 20 will now be described in detail with reference to FIGS. 9 and 10. In particular, the configuration of the battery module 11 that is capable of realizing the authentication method according to the present embodiment will now be described in detail.

2-5-1. Electric Vehicle 10

First, the configuration of the electric vehicle 10 will be described.

Figure 9:
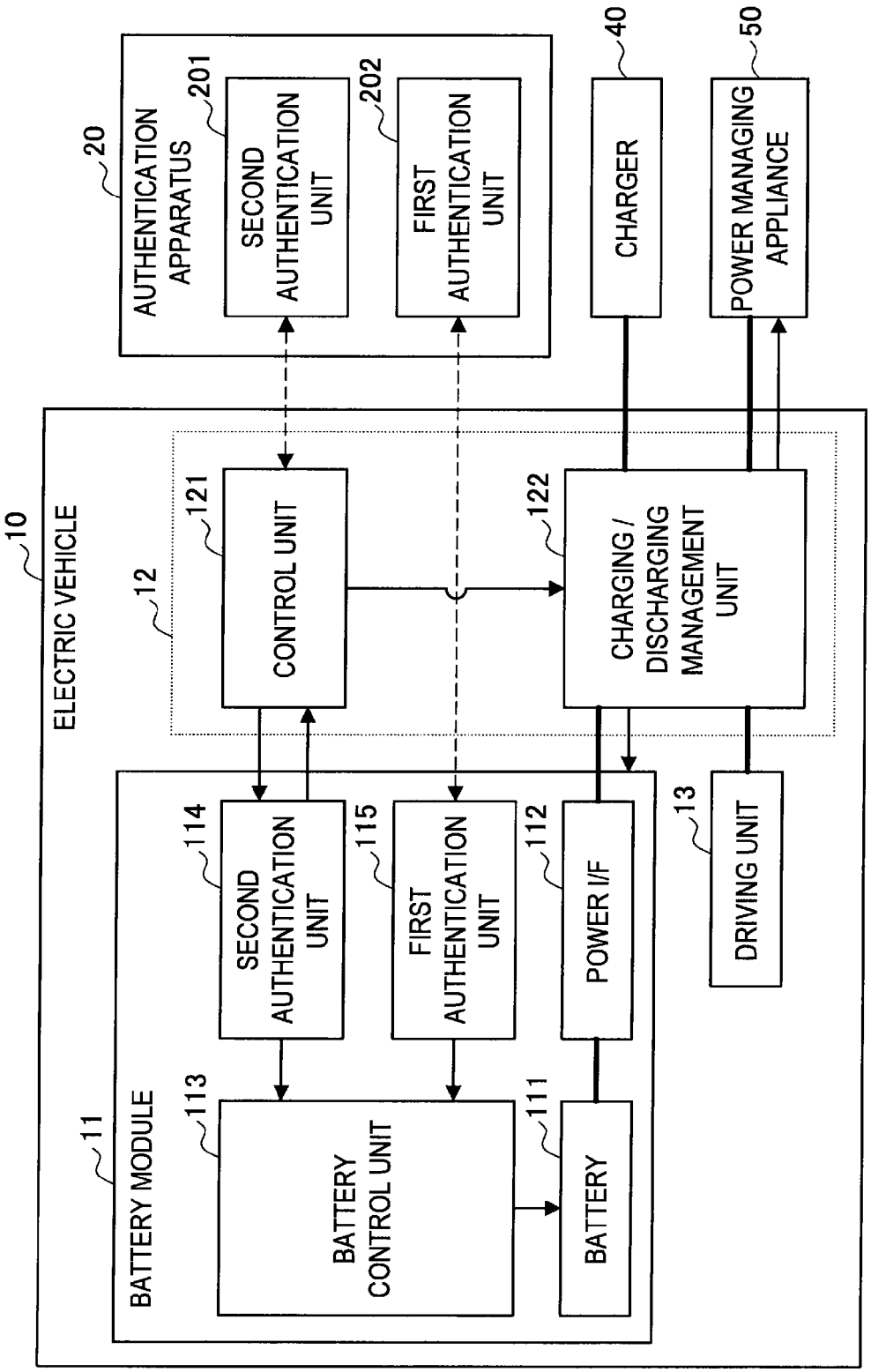
FIG. 9 is a diagram useful in explaining the detailed configuration of an electric vehicle and an authentication apparatus according to the same embodiment.

As shown in FIG. 9, the electric vehicle 10 includes the battery module 11, the driving control unit 12, and the driving unit 13. The battery module 11 includes a battery 111, a power interface 112, a battery control unit 113, a second authentication unit 114, and a first authentication unit 115. In addition, the driving control unit 12 includes a control unit 121 and a charging/discharging management unit 122. The various component elements will now be described below.

Driving Control Unit 12

First, the driving control unit 12 will be described.

Control Unit 121

The control unit 121 controls the operation of the various components that construct the electric vehicle 10. For example, the control unit 121 controls the charging/discharging management unit 122 to supply power from the battery module 11 to the driving unit 13. The control unit 121 controls the charging/discharging management unit 122 to supply power supplied via a charger 40 or a power managing appliance 50 (for example, a smart meter) to the battery module 11. In addition, the control unit 121 provides the second authentication route when carrying out the second authentication between the authentication apparatus 20 and the battery module 11. The control unit 121 may also be configured to control the charging/discharging management unit 122 to discharge power from the battery module 11 and supply the discharged power to the power managing appliance 50.

Charging/Discharging Management Unit 122

The charging/discharging management unit 122 manages charging and discharging of the battery module 11. The charging/discharging management unit 122 causes the battery module 11 to discharge power in accordance with control by the control unit 121 and supplies the discharged power to the driving unit 13. In addition, in accordance with control by the control unit 121, the charging/discharging management unit 122 supplies power supplied via the charger 40 or the power managing appliance 50 to the battery module 11 to charge the battery module 11. The charging/discharging management unit 122 may also be configured to discharge power from the battery module 11 in accordance with control by the control unit 121 and supply the discharged power to the power managing appliance 50.

Note that information relating to the power supplied via the charging/discharging management unit 122 from the power managing appliance 50 and to the power supplied to the power managing appliance 50 is provided from the charging/discharging management unit 122 to the power managing appliance 50. As described above, the charging/discharging management unit 122 manages the supplying of power to the driving unit 13. Since the driving unit 13 is a device that produces a driving force in accordance with the amount of power supplied to it, the charging/discharging management unit 122 can be said to be a device that actually controls the driving force. However, the amount of power supplied to the driving unit 13 is controlled by the control unit 121. In this way, the function of the driving control unit 12 is realized by cooperative operation of the control unit 121 and the charging/discharging management unit 122.

Battery Module 11

The battery module 11 is described next.

Battery 111 and Power Interface 112

The battery 111 is a power storing device for storing power. As examples, storage cells, capacitors, or the like are used as the battery 111. Examples of a storage cell include a lithium ion cell, a nickel metal hydride cell, a lead storage cell, and an NAS cell (sodium-sulfur battery) cell. Examples of a capacitor include a field effect capacitor, a ceramic capacitor, and an electrical double-layer capacitor. Note that the battery 111 is not limited to the example described above and it is possible to use an arbitrary power storage device that is capable of storing energy in some manner and being discharged. The battery 111 is also electrically connected via the power interface 112 to the charging/discharging management unit 122.

Battery Control Unit 113

The battery control unit 113 controls discharging of the battery 111. As one example, on receiving an instruction for discharge of the battery 111 from the charging/discharging management unit 122, the battery control unit 113 causes power to be discharged from the battery 111. In addition, the power outputted from the battery 111 is inputted via the power interface 112 to the charging/discharging management unit 122. However, if the first authentication and the second authentication described earlier did not succeed, the battery control unit 113 does not cause the battery 111 to discharge even when an instruction for discharge of the battery 111 is received from the charging/discharging management unit 122. Note that notification of the result of the first authentication is received from the first authentication unit 115. Similarly, notification of the result of the second authentication is received from the second authentication unit 114.

First Authentication Unit 115 and Second Authentication Unit 114

The second authentication unit 114 carries out second authentication with the authentication apparatus 20 via the second authentication route. When the second authentication has succeeded, the second authentication unit 114 notifies the battery control unit 113 that the second authentication succeeded.

In the same way, the first authentication unit 115 carries out first authentication with the authentication apparatus 20 via the first authentication route. When the first authentication has succeeded, the first authentication unit 115 then notifies the battery control unit 113 that the first authentication succeeded. Note that the second authentication unit 114 carries out the second authentication by communicating with the authentication apparatus 20 via the control unit 121. Meanwhile, the first authentication unit 115 carries out first authentication by directly communicating with the authentication apparatus 20.

Note that the first authentication unit 115 may be configured to store the result of the first authentication and the key information to be used in the second authentication in a storage device (not shown), such as a nonvolatile memory, and to notify only the result (whether a bind has been set or not set) to the battery control unit 113. In this way, by storing the result of the first authentication and the key information in a storage device, it is possible once the first authentication has succeeded to omit execution of the first authentication whenever the battery 111 is used. When a bind has been set, the second authentication unit 114 carries out the second authentication using the key information stored in the storage device described above.

When a bind is removed, the first authentication unit 115 carries out the first authentication with the authentication apparatus 20 and deletes the key information that was stored in the storage device described above when the first authentication succeeded. At this time, the first authentication unit 115 stores the result of the first authentication in the storage device described above. After the bind has been released, it becomes possible to remove the battery module 11 and move the battery module 11 to another appliance. In the other appliance to which the battery module 11 has been moved, by carrying out the first authentication using the authentication apparatus 20 and setting a bind, the user becomes able to use the battery module 11 in the other appliance.

The configuration of the electric vehicle 10 has been described above. Note that only authentication relating to setting and releasing of a bind for the battery module 11 and discharging control of the battery module 11 have been described above. However, in reality, it is also necessary to carry out authentication relating to typical entry and driving operations of the electric vehicle 10, such as unlocking the doors of the electric vehicle 10 and starting the driving unit 13. For example, for authentication relating to unlocking the doors, a separate authentication device (not shown) to the electric vehicle 10 and the authentication apparatus 20 may be provided, or such authentication may be included in the second authentication function.

2-5-2. Authentication Apparatus 20

Next, the configuration of the authentication apparatus 20 will be described.

As shown in FIG. 9, the authentication apparatus 20 is constructed of a second authentication unit 201 and a first authentication unit 202. The second authentication unit 201 carries out second authentication via the second authentication route. Meanwhile, the first authentication unit 202 carries out first authentication via the first authentication route. Note that the second authentication unit 201 communicates with the control unit 121 of the electric vehicle 10 and carries out the second authentication with the second authentication unit 114 of the electric vehicle 10 via the control unit 121. Meanwhile, the first authentication unit 202 communicates directly with the first authentication unit 115 of the electric vehicle 10 and carries out the first authentication with the first authentication unit 115 of the electric vehicle 10.

This completes the description of the configuration of the authentication apparatus 20.

2-5-3. Communication Devices/Methods

Description of specific communication devices and/or methods for communication between the electric vehicle 10 and the authentication apparatus 20 has not been given thus far. For this reason, a supplementary description of communication devices and/or methods that construct the first authentication route and the second authentication route will be given here.

First, the communication between the electric vehicle 10 and the authentication apparatus 20 may be wired or wireless communication. In the case of wired communication, the communication may be signal line communication using signal lines that are capable of transferring data or may be power line communication that uses power lines. More specifically, it is possible to carry out communication using a cable that conforms to a standard such as USB (Universal Serial Bus) or IEEE 1394.

In the case of wireless communication, it is possible to use an RF signal, infrared communication, visible light communication, near-field communication, or the like. As specific examples, it is possible to use IrDA, a wireless LAN, Bluetooth (Registered Trademark), Transfer Jet (Registered Trademark), a Body Area Network, or magnetic communication. As described above, although a variety of communication devices and/or methods could conceivably be used, as one example the first authentication route should preferably use a wired or wireless communication device that is in typical use by an immobilizer or the like. Meanwhile, for the second authentication route, since it is necessary to communicate directly with the battery module 11 provided in the electric vehicle 10, it is preferable to use a wireless communication device and/or method.

This completes the description of the communication devices/methods.

2-5-4. Modification

Figure 10:
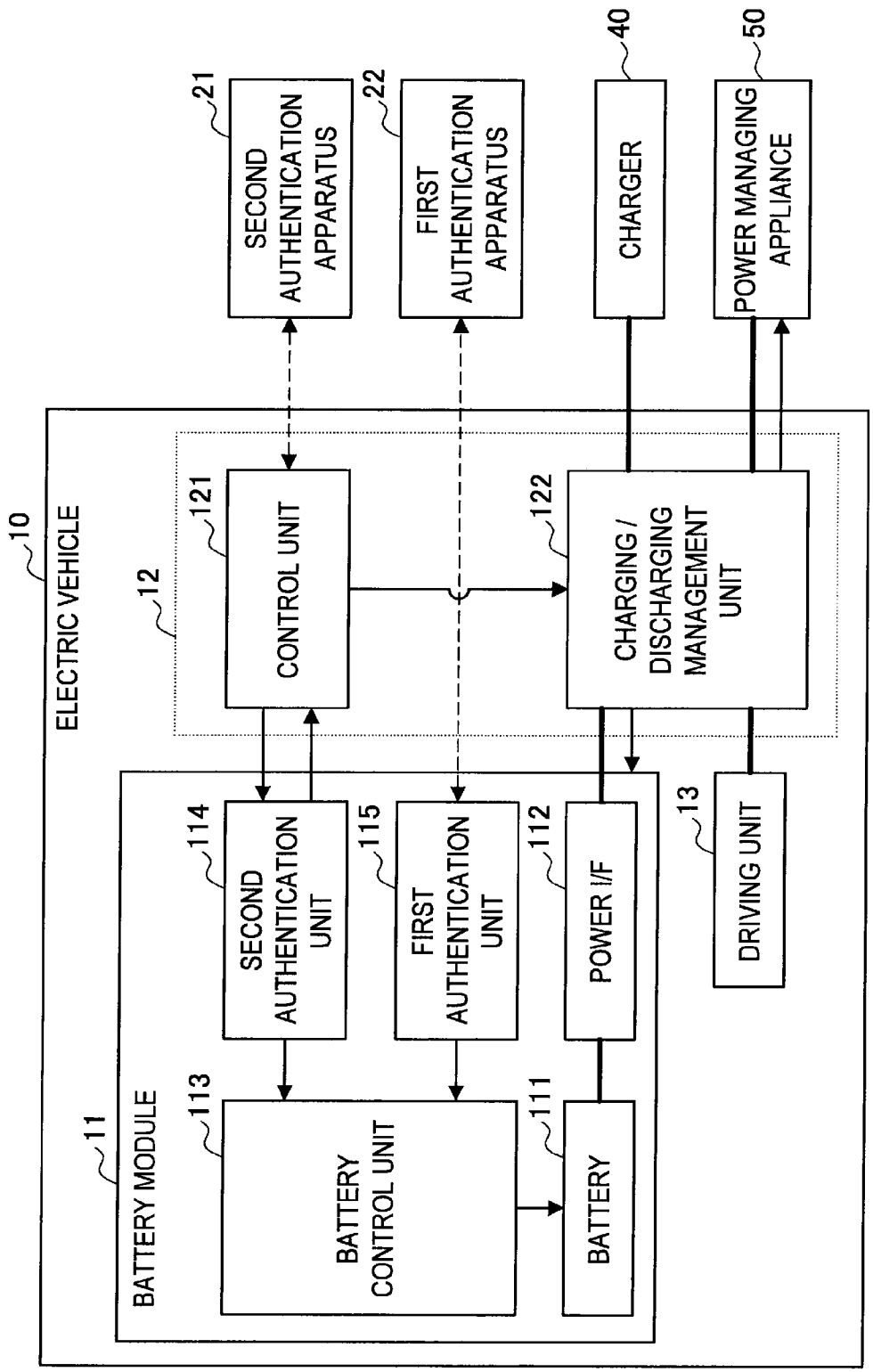
FIG. 10 is a diagram useful in explaining the detailed configuration of an electric vehicle and an authentication apparatus according to a modification to the same embodiment.

Next, a modification to the present embodiment will be described with reference to FIG. 10. The battery module 11 shown in FIG. 9 carries out the first authentication and the second authentication with one authentication apparatus 20. However, as shown in FIG. 10, the battery module 11 may be configured so as to carry out the first authentication and the second authentication with two different authentication apparatuses (the first authentication apparatus 22 and the second authentication apparatus 21). That is, FIG. 10 is a modification where the second authentication unit 201 and the first authentication unit 202 that construct the authentication apparatus 20 shown in FIG. 9 are configured as separate devices.

In the example in FIG. 10, the first authentication apparatus 22 carries out the first authentication via the first authentication route and the second authentication apparatus 21 carries out the second authentication via the second authentication route. As described earlier, the first authentication is mainly carried out when the battery module 11 is moved and is therefore not carried out frequently. Meanwhile, the second authentication is carried out when changing or starting to use the appliance to which the battery module 11 has been transferred.

In this way, there is a large difference in implementation frequency between the first authentication and the second authentication. From the viewpoint of convenience, a second authentication function should be provided in an immobilizer or the like carried by the user. Accordingly, the second authentication apparatus 21 should preferably be a device, such as an immobilizer, that is carried by the user. Meanwhile, a first authentication function does not need to be provided in a device carried by the user. Also, the first authentication apparatus 22 does not need to be a device that is managed by the user.

As one example, the first authentication apparatus 22 may be a device that is managed by an external authentication body or a service center. By splitting the first authentication and the second authentication between authentication apparatuses as in this modification, it is possible to separate the user of the battery module 11 and the manager of the bind. Note that even when the configuration of the authentication parties is modified in this way, there is effectively no change in the configuration of the electric vehicle 10 itself. The first authentication unit 115 of the battery module 11 carries out the first authentication with the first authentication apparatus 22. In the same way, the second authentication unit 114 of the battery module 11 carries out the first authentication with the second authentication apparatus 21. This point is the only difference. This completes the description of one modification to the present embodiment.

As described above, by providing an arrangement that carries out two types of authentication (the first authentication and the second authentication) in the battery module 11, it is possible to realize an arrangement that enables the battery module 11 to be transferred while maintaining security against theft.

3. Conclusion

Finally, the technical content of the embodiment described above will be reviewed in brief. The technical content here can be applied to a battery module provided in an information processing apparatus such as a PC, a mobile telephone, a mobile game console, a mobile information terminal, an intelligent home appliance, or a car navigation system, an electric vehicle such as an electric car, an electric bicycle, an electric ship, and an electric airplane, a home battery, or another home appliance.

It is possible to realize the functional configuration of the battery module described above as follows. The battery module 11 includes a power storage unit, a first authentication unit, a second authentication unit, and a discharging control unit as described below. The power storage unit is a device that stores power. The first authentication unit described above is a device that carries out the first authentication via the first authentication route. The second authentication unit described above is a device that carries out the second authentication via the second authentication route. The discharging control unit described above is a device that controls discharging from the power storage unit to an external appliance.

When the first authentication has succeeded, the first authentication unit shares the key information used in the second authentication with the authentication party of the second authentication. The second authentication unit then carries out second authentication using key information shared with the authentication party. In addition, the discharging control unit permits discharging from the power storage unit when the second authentication has succeeded. In this way, by carrying out authentication for managing attachment and detachment of a battery module separately to the authentication when the battery module is used, it becomes possible to transfer a battery module while maintaining security.

Remarks

The battery 111 described above is one example of a "power storage unit" for the present application. The electric vehicle 10 and the home battery server 30 described above are examples of "external appliances". The first authentication apparatus 22 described above is one example of a "first authentication apparatus". The second authentication apparatus 21 described above is one example of a "second authentication apparatus". The first authentication route described above is one example of a "first authentication route". The second authentication route described above is one example of a "second authentication route". The driving control unit 12 described above is one example of a "control unit". The second authentication unit 201 described above is one example of a "first authentication unit" on the authentication apparatus-side. The first authentication unit 202 described above is one example of a "second authentication unit" on the authentication apparatus-side.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A battery module comprising:
a power storage unit storing power;
a first authentication unit carrying out first authentication of the power storage unit with a first authentication apparatus via a first authentication route;
a second authentication unit carrying out second authentication with a second authentication apparatus via a second authentication route; and
a discharging control unit controlling discharging from the power storage unit to an external appliance,
wherein when the first authentication of the power storage unit has succeeded, key information to be used in the second authentication is shared from the power storage unit to the second authentication unit,
wherein the second authentication apparatus is different from the first authentication apparatus,
wherein the second authentication unit carries out the second authentication using the shared key information, and
wherein the discharging control unit is operable, when the second authentication has succeeded, to permit discharging from the power storage unit.

2. The battery module according to claim 1, wherein the first authentication unit carries out the first authentication with the first authentication apparatus owned by a user via the first authentication route.

3. The battery module according to claim 2, wherein the first authentication unit carries out the first authentication using the first authentication route where direct communication with the first authentication apparatus is possible, and
the second authentication unit carries out the second authentication using the second authentication route that differs from the first authentication route.

4. The battery module according to claim 3, wherein the battery module is installed in an electric vehicle including:
- a driving unit driving the electric vehicle using the power supplied from the power storage unit; and
- a control unit controlling supplying of the power to the driving unit.

5. The battery module according to claim 4, wherein the second authentication unit carries out the second authentication using the second authentication route that passes the control unit of the electric vehicle.

6. The battery module according to claim 1, wherein the first authentication unit carries out the first authentication using the first authentication route where direct communication with the first authentication apparatus is possible, and
the second authentication unit carries out the second authentication using the second authentication route that differs from the first authentication route.

7. The battery module according to claim 6, wherein the battery module is installed in an electric vehicle including:
- a driving unit driving the electric vehicle using the power supplied from the power storage unit; and
- a control unit controlling supplying of the power to the driving unit.

8. The battery module according to claim 7, wherein the second authentication unit carries out the second authentication using the second authentication route that passes the control unit of the electric vehicle.

9. The battery module according to claim 1, wherein the first authentication unit is operable to store result of the first authentication and the shared key information in a storage device.

10. An electric vehicle comprising:
a connection terminal for connecting to a battery module that includes
- a power storage unit storing power,
- a first authentication unit carrying out first authentication of the power storage unit with a first authentication apparatus via a first authentication route,
- a second authentication unit carrying out second authentication with a second authentication appartaus via a second authentication route, and
- a discharging control unit controlling discharging from the power storage unit to an external appliance,
- wherein when the first authentication of the power storage unit has succeeded, key information to be used in the second authentication is shared from the power storage unit to the second authentication unit,
- wherein the second authentication apparatus is different from the first authentication apparatus,
- wherein the second authentication unit carries out the second authentication using the shared key information, and
- wherein the discharging control unit is operable, when the second authentication has succeeded, to permit discharging from the power storage unit;
a driving unit driving the electric vehicle using the power supplied from the power storage unit; and
a control unit controlling supplying of the power to the driving unit.

11. The electric vehicle according to claim 10, wherein the shared key information is deleted when connection between the battery module and the electric vehicle is disconnected.

12. The electric vehicle according to claim 10, wherein the first authentication route is used to share or delete the shared key information.

13. The electric vehicle according to claim 10, wherein the discharging control unit is operable to permit the supplying of the power to the driving unit when the key information is shared with the second authentication apparatus and the second authentication has succeeded.

14. An authentication apparatus carrying out authentication for a battery module that includes
a power storage unit storing power;
a first authentication unit carrying out first authentication of the power storage unit with a first authentication apparatus via a first authentication route;
a second authentication unit carrying out second authentication with a second authentication apparatus via a second authentication route; and
a discharging control unit controlling discharging from the power storage unit to an external appliance,
wherein when the first authentication of the power storage unit has succeeded, key information to be used in the second authentication is shared from the power storage unit to the second authentication unit,
wherein the second authentication apparatus is different from the first authentication apparatus,
wherein the second authentication unit carries out the second authentication using the shared key information, and
wherein the discharging control unit is operable, when the second authentication has succeeded, to permit discharging from the power storage unit.

15. A discharging control method for a battery module that includes a power storage unit storing power and a discharging control unit controlling discharging of the power storage unit to an external appliance, the discharging control method comprising steps of the battery module:
carrying out first authentication of the power storage unit with a first authentication apparatus via a first authentication route;
sharing key information to be used in second authentication with a second authentication apparatus, when the first authentication of the power storage unit has succeeded,
wherein the key information to be used in the second authentication is shared from the power storage unit to the second authentication apparatus;
wherein the second authentication apparatus is different from the first authentication apparatus;
carrying out the second authentication with the second authentication apparatus via a second authentication route using the shared key information; and
permitting discharging from the power storage unit by the discharging control unit when the second authentication has succeeded.

* * * * *